UNITED STATES PATENT OFFICE.

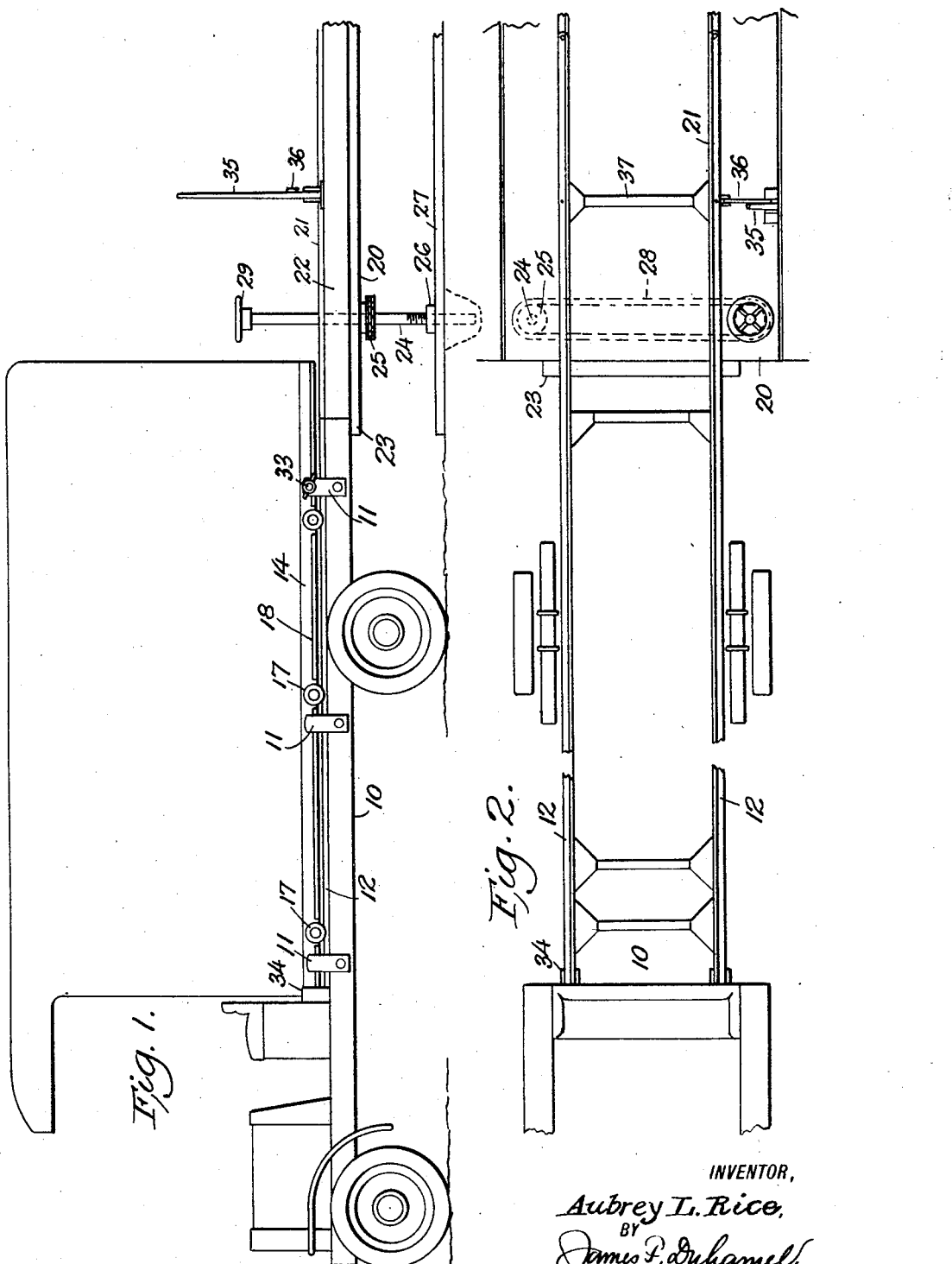

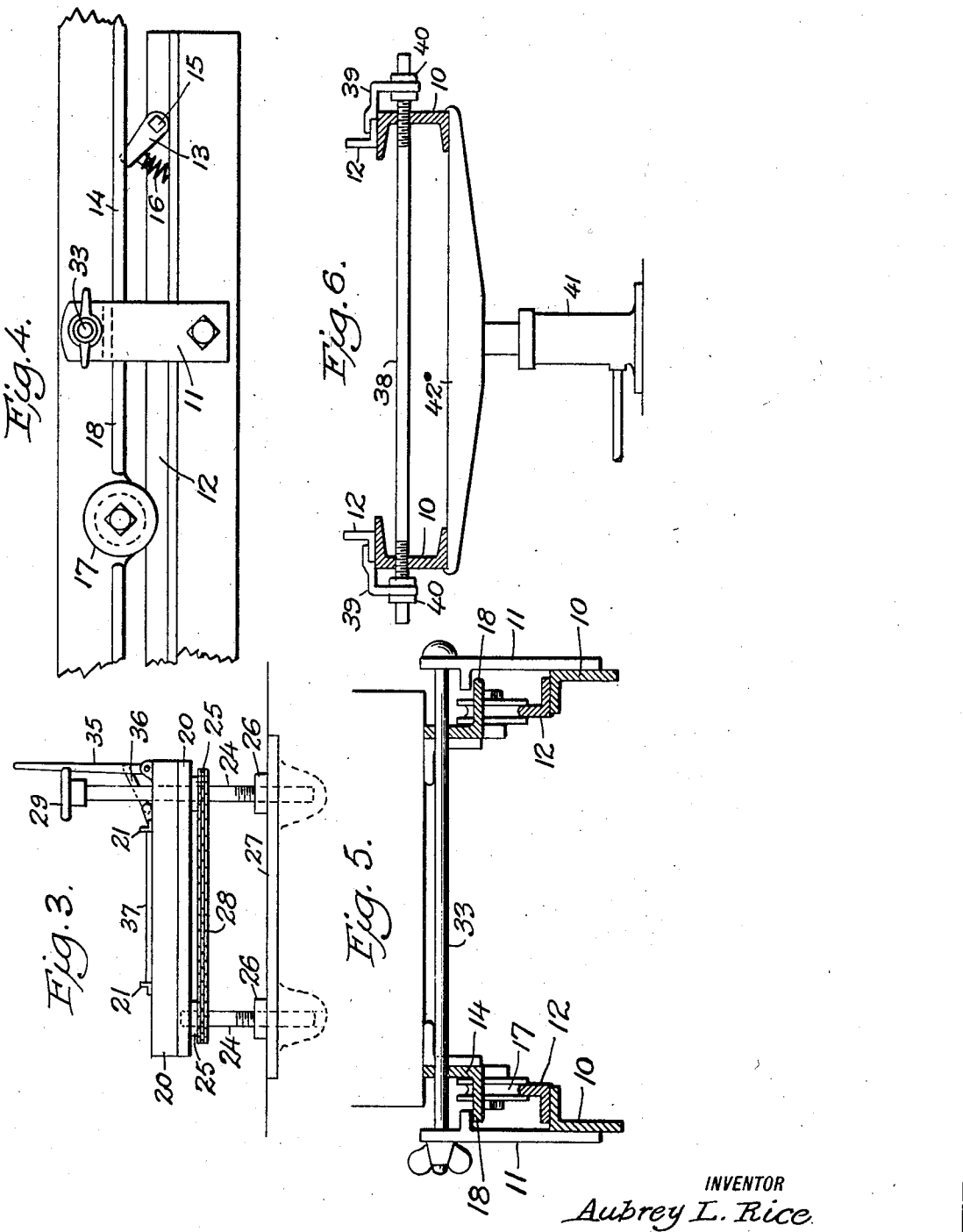
A. L. RICE.
TRUCK LOADING DEVICE.
APPLICATION FILED OCT. 13, 1919.
1,354,688.
Patented Oct. 5, 1920.
2 SHEETS—SHEET 2.
INVENTOR
Aubrey L. Rice
BY
James P. Duhamel
ATTORNEY

AUBREY L. RICE, OF NEW YORK, N. Y., ASSIGNOR OF ONE-HALF TO FREDERICK W. HUESTIS, OF NEW YORK, N. Y.

TRUCK-LOADING DEVICE.

1,354,688.   Specification of Letters Patent.   Patented Oct. 5, 1920.

Application filed October 13, 1919. Serial No. 330,400.

*To all whom it may concern:*

Be it known that I, AUBREY L. RICE, a citizen of the United States, residing at New York, New York county, New York State, have invented certain new and useful Improvements in Truck-Loading Devices, of which the following is a specification.

This invention relates to motor trucks and more especially to means for quickly loading and unloading the same and consists of an additional body or inclosure and means for removing one body and replacing it with another to carry off a load of goods or to receive the same and load up with a different line of articles to be hauled. The object of the invention is to further provide means for so positioning the bodies that they are quickly and easily located on the truck or a loading platform, all of which is more fully described in the following specification, set forth in the appended claims and illustrated in the accompanying drawings, wherein:

Figure 1 is a side view of a truck and its loading platform,

Fig. 2 is a plan view of the same,

Fig. 3 is a face view of the loading platform,

Fig. 4 is a side view of the retaining lock for the body on the truck,

Fig. 5 is a sectional view through the sill of the body and the rail of the truck, Fig. 6 shows how the adjustments may be made on the truck for a stationary platform.

The truck and body shown in Fig. 1, comprises a truck or chassis of any desired type or form with the side beams 10, having the jaws 11, secured thereto at different points along its length at the outside, and at the top of each beam is a rail 12, as more clearly shown in Fig. 5, this beam 10, also carries a pawl 13, as shown in Fig. 4, to engage a socket or notch in the sill of the body or the angle iron beam 14, to retain the body on the truck and prevent its release until it is desired to unload the same when its stem 15, may be turned by a handle or wrench against the pressure of the spring 16.

The horizontal member of the beam 14, is cut away at various points so that rollers 17, may be journaled on said beam and as shown in Fig. 5, these horizontal sections 18, extend beyond the face of the rollers, so they may be engaged by the jaws 11, to prevent the body from being upset and leaving the chassis.

The body above described and shown is adapted to be quickly run upon the chassis with a load of goods and sent to its destination for the distribution of the goods, or it may be removed with its load and an empty body placed on the chassis.

This loading and unloading of the van or the chassis is performed by means of a movable platform 20, of which one end is shown in the drawings but must be of a length equal the body or greater and has tracks 21, corresponding with the rails 12, at each side of the truck and having means for lateral and vertical adjustment.

When the truck is in position to receive or be relieved of a body the beams 10, abut the beams 22 of the platform or the same is so adjusted and a ledge 23, brought beneath the rear ends of the beams 10, to prevent the sagging of a truck when receiving its load.

To adjust the platform vertically screws 24, are located at the front of the platform and carry rollers 25, in forks at their upper ends. The screws are adjusted vertically by means of nuts 26, having sprocket teeth and which are rotated by a sprocket wheel 27, at the lower end of the shaft 28, and which is rotated by the hand wheel 29, above the platform, the shaft, having a squared head 30, so that the hand wheel or wrench may be used and removed from the path of the body.

The rear end of the platform may be supported by pivots which are not shown, nor is the abutment which holds the said platform from displacement when the truck strikes the outer end. The platform and rails must be readily adjusted to meet the end of the truck and its rails.

To prevent the release of the body and to securely fasten it to the truck, rods 34, are run through the upper ends of the jaws 11, and the bottom of the body, securely holding it against longitudinal movement and at the same time assisting in preventing the body from tipping over.

While the truck body and the platform are horizontal, very little effort is necessary to transfer the body from one to the other, but if the load is too great or there is an inclination, any well known means may be adopted to handle the body.

In order to adjust the rails 21, laterally to meet the rails of the truck, a lever 35, is pivoted to the flooring of the platform and connected with the rail by the rod 36, while a tie rod 37 connects the rails that are appropriately pivoted to allow them to swing on the platform.

The security of the body is further enhanced by the box 34 at the farther end of the truck on each side to receive the ends of the sills or beams 14, and prevent either lateral or vertical movement.

It is obvious that many common and well known details may be substituted for those above described and it is obvious that other modifications may be resorted to in the construction and arrangement of the device, without departing from the scope of the appended claims.

In Fig. 6, is shown a modified form for adjusting the truck itself for the platform and shows the rails 12 slidable on the beams 10, and adjusted by means of the screw 38, carrying at its ends the brackets 39, that are secured to the rails 12, and fit loosely between the collars 40, on the screw. By means of this screw, the rails are shifted to aline with those of a platform. To adjust the truck to the height of said platform, a jack 41, either pneumatic or hydraulic, may be used and its cross beam 42, located beneath the beams 10, to elevate them. While simple means are shown for the purpose of adjusting the truck and tracks, other similar means may be resorted to.

What I claim is:—

1. In a truck loading device, the combination of side beams having upwardly extending jaws and rails and provided with movable means, a detachable body adapted to be moved over the rails and held against lateral movement by the jaws, and an adjustable platform to receive the body.

2. In a truck loading device, the combination of a pair of movably mounted beams having jaws and rails, a platform with rails, means for adjusting the rails and platform to the same relative height, a body with anti-friction means to move over the rails, means on the body for engaging the jaws, and means for locking the body against movement over the rails.

3. In a truck loading device, the combination of a movable structure having rails at each side, jaws beside the rails, a platform with rails corresponding with the first mentioned rails, means for alining the two sets of rails, a body with anti-friction means to move over the rails, flanges on the body to pass under the jaws, and rods adapted to pass through the jaws and the body.

4. In a truck loading device, the combination of a wheel mounted truck having rails, jaws outside of the rails, a platform with corresponding rails, means for adjusting the rails laterally, means for adjusting the rails with relation to each other vertically, overhanging jaws carried by the truck, a body movable over the rails, flanges at the sides of the body and adapted to pass under the jaws, guide boxes on the truck to receive the end of the body, and a tie rod adapted to pass through the jaws and the flanges to retain the body on the truck.

5. In a truck loading device, the combination of a truck, rails on the upper side of same with overhanging jaws, a platform with corresponding rails and having a forward supporting ledge, screws to adjust the platform vertically, means for adjusting the rails laterally, a body movable over the rails, housing boxes at one end of the rails, beams at the bottom of the body and having flanges to engage the jaws, and a tie rod to pass through a beam and a jaw at each side of the device to lock the body and the truck together.

In testimony whereof, I have signed my name to this specification in the presence of two subscribing witnesses, this 23d day of September, 1919.

AUBREY L. RICE.

Witnesses:
James F. Duhamel,
Martin A. Leach.